US011959729B2

(12) United States Patent
Wilkinson et al.

(10) Patent No.: US 11,959,729 B2
(45) Date of Patent: Apr. 16, 2024

(54) PROJECTILE RANGING WITH DIGITAL MAP

(71) Applicant: Atlantic Inertial Systems Limited, Plymouth (GB)

(72) Inventors: Nicholas Robert Geoffrey Wilkinson, Plympton (GB); Martin Richard Godfrey, Plymouth (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 121 days.

(21) Appl. No.: 17/168,656

(22) Filed: Feb. 5, 2021

(65) Prior Publication Data

US 2021/0247166 A1 Aug. 12, 2021

(30) Foreign Application Priority Data

Feb. 7, 2020 (EP) .................................... 20275029

(51) Int. Cl.
*F41G 9/00* (2006.01)

(52) U.S. Cl.
CPC ................................... *F41G 9/002* (2013.01)

(58) Field of Classification Search
CPC .. F41G 9/002; F41G 3/24; B64D 1/04; B64D 43/00; B64D 45/00; G01C 21/005; G01S 13/882; G06F 16/29
USPC .......................................................... 701/408
See application file for complete search history.

(56) References Cited

U.S. PATENT DOCUMENTS

| | | | | |
|---|---|---|---|---|
| 5,451,014 | A * | 9/1995 | Dare | F41G 7/007 244/3.21 |
| 5,828,332 | A * | 10/1998 | Frederick | G01S 13/935 342/197 |
| 6,216,595 | B1 * | 4/2001 | Lamorlette | G01P 3/665 102/270 |
| 6,281,841 | B1 * | 8/2001 | Nevill | G01S 19/18 342/357.65 |
| 6,744,397 | B1 | 6/2004 | Hager et al. | |
| 9,074,848 | B1 * | 7/2015 | Hunter, Jr. | G06G 7/80 |
| 9,749,786 | B1 * | 8/2017 | Pandey | H04W 4/029 |
| 2007/0171234 | A1 * | 7/2007 | Crawfis | G06T 17/05 345/587 |

(Continued)

OTHER PUBLICATIONS

Extended European Search Report for International Application No. 20275029.5 dated Aug. 4, 2020, 118 pages.

(Continued)

*Primary Examiner* — Vivek D Koppikar
*Assistant Examiner* — Dominick Mulder
(74) *Attorney, Agent, or Firm* — CANTOR COLBURN LLP

(57) ABSTRACT

A terrain-referenced navigation system for an aircraft comprises: a stored digital terrain map; a position calculation unit arranged to calculate aircraft position relative to the stored digital terrain map to determine a terrain-referenced aircraft position; a fall line calculation unit arranged to calculate a fall line for a projectile starting from the terrain-referenced aircraft position as a launch point; and an impact point calculation unit arranged to directly compare the fall line with the digital terrain map, by incrementally comparing a height of the projectile along the fall line with a height of the terrain according to the stored digital terrain map in order to find an expected impact point on the terrain.

14 Claims, 6 Drawing Sheets

300
304 Input projectile data
306 Input terrain-referenced aircraft position
308 Calculate fall line
310 Increment along fall line to next map sheet boundary
312 Compare height of projectile to maximum height in sheet just crossed?
314 $h_{projectile} < \max(h_{sheet})$?
No
Yes
316 Return to previous map sheet boundary 302
318 Increment along fall line to next boundary row or column of map posts
320 Compare height of projectile to interpolated height of nearest map posts
322 $h_{projectile} < h_{terrain}$?
No
Yes
324 Interpolate between final two points to estimate impact point
326 Impact point displayed to pilot

(56) References Cited

U.S. PATENT DOCUMENTS

| | | | | |
|---|---|---|---|---|
| 2011/0261162 | A1 | 10/2011 | Holicki et al. | |
| 2012/0145786 | A1* | 6/2012 | Weaver | F41G 3/165<br>235/407 |
| 2014/0045564 | A1 | 2/2014 | Guo et al. | |
| 2015/0342727 | A1* | 12/2015 | Fernández Gutiérrez | A61F 2/164<br>623/6.24 |
| 2018/0080751 | A1 | 3/2018 | Ginsberg et al. | |
| 2020/0231302 | A1* | 7/2020 | Turner | B64C 39/024 |
| 2020/0413217 | A1* | 12/2020 | Rothschild | H04W 4/026 |

OTHER PUBLICATIONS

Jeremy R. Henry, "Comparing a Ballistic Trajectory to Terrain Using Digital Elevation Data", Apr. 13, 1995, retrieved from the Internet on Jul. 22, 2020, 108 pages.

EPO Official Letter for Application No. 20275029.5, mailed Feb. 8, 2024, 6 pages.

J. R. Fountain, "Digital terrain systems," Workshop on Airborne Navigation Systems (Digest No. 1997/169), London, UK, 1997, pp. 4/1-4/6, doi: 10.1049/ic:19970909.

* cited by examiner

PROJECTILE RANGING WITH DIGITAL MAP

FOREIGN PRIORITY

This application claims priority to European Patent Application No. 20275029.5 filed Feb. 7, 2020, the entire contents of which is incorporated herein by reference.

TECHNICAL FIELD

The present disclosure relates to a terrain-referenced navigation system for an aircraft, a terrain-referenced navigation method, and a computer-readable medium. In particular, the disclosed terrain-referenced navigation systems and methods integrate projectile fall line calculations with digital terrain map data to allow the impact point of a projectile with the terrain to be estimated.

BACKGROUND

Terrain Referenced Navigation (TRN) systems which integrate aircraft navigation data, radar altimeter data and digital terrain elevation data to generate a navigation solution are in service on a number of airborne platforms. Such systems provide enhanced navigation, situational awareness and air to ground ranging capabilities.

Aircraft and other vehicles may be designed to launch projectiles for a variety of reasons, including scientific research, meteorological or geological surveys, civilian assistance, and military objectives. Assuming a uniform gravity field and known atmospheric conditions, a projectile launched with known initial conditions (e.g. initial height, launch angle and velocity) will have a predictable flight path.

In a typical in-service aircraft mechanisation, an independent ranging system is used to estimate the fall line of a projectile and calculate the three dimensional range to the projectile's impact point with the terrain, and the TRN system then uses the horizontal range to determine the terrain height at the estimated impact point. The terrain height is then fed back to the ranging system, which then recalculates the projectile impact point based on the updated terrain height information. The two functions, implemented in separate avionics systems, work in an iterative loop and provide the pilot with real time visibility of where the projectile will land if released. However, the stability of the iterative loop is dependent on the geometry of the fall line and the terrain gradient around the impact point. It has been found that the iterative loop can become unstable if the intercept angle between the terrain and the fall line becomes unfavourable.

The present disclosure seeks to provide an improved a terrain-referenced navigation system for an aircraft.

SUMMARY

According to a first aspect, this disclosure provides a terrain-referenced navigation system for an aircraft, the system comprising: a stored digital terrain map; a position calculation unit arranged to calculate aircraft position relative to the stored digital terrain map to determine a terrain-referenced aircraft position; a fall line calculation unit arranged to calculate a fall line for a projectile starting from the terrain-referenced aircraft position as a launch point; and an impact point calculation unit arranged to directly compare the fall line with the digital terrain map, by incrementally comparing a height of the projectile along the fall line with a height of the terrain according to the stored digital terrain map in order to find an expected impact point on the terrain.

Unlike previous terrain-referenced navigation (TRN) systems, it will be appreciated that the disclosed TRN system implements a fall line calculation itself, by performing a direct comparison of the fall line with the terrain around the aircraft to find the impact point. This will effectively remove the iterative loop previously required between a TRN system and an independent ranging system, and hence the risk of instabilities e.g. arising from complicated terrain profiles. An iterative loop between a TRN system and an independent projectile launching system can be avoided entirely.

According to this disclosure, the height of the projectile is incrementally compared with the terrain height not along a straight line but along the fall line. It is convenient that the projectile height that can be directly compared with the terrain height according to the digital terrain map. Furthermore, the intercept point of the fall line with the terrain can be calculated more accurately as the fall line calculation benefits from the terrain-referenced aircraft position as a launch point, rather than absolute aircraft height e.g. as measured by Global Navigation Satellite System (GNSS), Global Positioning Systems (GPS), or similar navigation technologies, which may not directly and accurately register the aircraft position with respect to the terrain map database.

In various examples of the present disclosure, the impact point calculation unit is arranged to incrementally compare a height of the projectile along the fall line with a height of the terrain by searching map data in the stored digital terrain map. Taking into account factors such as the available resolution of the map data in the stored digital terrain map and/or processing speed of the impact point calculation unit, the step of searching map data may comprise a single search of the digital terrain map.

In one or more examples, the impact point calculation unit is arranged to incrementally compare a height of the projectile along the fall line with a height of the terrain according to a coarse search of map data in the stored digital terrain map and then according to a fine search of map data in the stored digital terrain map. In such examples, the coarse search may have a resolution of the order of 1 km to 3 km, e.g. a resolution of about 1 km, 1.5 km, 2 km, 2.5 km or 3 km. In such examples, in addition or alternatively, the fine search may have a resolution in the range of 1 m to 100 m, e.g. a resolution of about 1 m, 5 m, 10 m, 20 m, 30 m, 40 m, 50 m, 60 m, 70 m, 80 m, 90 m or 100 m. Of course the resolution used for the coarse search and/or fine search may depend on the resolution of the stored digital terrain map (i.e. digital terrain map database) being used.

In various examples, the stored digital terrain map may be obtained from satellite and/or aerial reconnaissance. In various examples, the stored digital terrain map may comprise a three dimensional terrain model. As is known in the art, the stored digital terrain map may include digital terrain map data with a resolution of 1 m to 100 m (for example as per Digital Terrain Elevation Data (DTED) Levels 1 and 2 defined in MIL-PRF-89020B).

In some examples, the system may comprise a communications link arranged to access a stored digital terrain map in the cloud.

In other examples, the system does not require such a communications link. In some examples, the system comprises a local memory containing the stored digital terrain map. To save on local memory space, the stored digital terrain map may not be a complete map. Only a subset of map data relevant to the terrain expected to be traversed in a given flight may be stored. Thus, in at least some examples, the stored digital terrain map comprises a plurality of subsets of map data cached in the local memory.

In at least some examples, the system comprises a processor arranged to calculate a maximum terrain height within each subset of map data while caching the plurality of subsets of map data. This is a convenient way of storing the maximum terrain height ready for comparing with the projectile height along the fall line.

The system may comprise one or more processors to provide the position calculation unit, fall line calculation unit and impact point calculation unit. The one or more processors may form an integrated TRN system. However it is a benefit of the present disclosure that a single processor can provide the functions of determining a terrain-referenced aircraft position, calculating a fall line and calculating an impact point. Thus, in at least some examples, the position calculation unit, fall line calculation unit and impact point calculation unit are arranged in a single processor.

In at least some examples, the system comprises an output unit arranged to output the expected impact point on the terrain, for example arranged to display the expected impact point on the terrain. For example, the output unit may be connected to or comprise an aircraft display, such as a pilot's Heads-Up Display (HUD). For example, the output unit may be arranged to output the expected impact point in the form of a Constantly Computed Impact Point (CCIP).

The fall line calculation unit may be arranged to calculate a fall line for the projectile using any known technique. The equations of motion for a projectile launched at a given angle with a given velocity are well known and there are standard modifications available to optionally take into account factors such as air resistance and drag.

In at least some examples, the system may comprise stored projectile data. For example, the launch velocity of the projectile may be preset and stored in a local memory. In at least some other examples, the system may comprise an input unit for projectile data e.g. connected to the fall line calculation unit to assist with calculating a fall line for the projectile. This enables an operator to input variables such as one or more of the launch velocity, mass, cross-sectional area, drag coefficient, etc. for a given projectile. Such an input unit is unusual as compared to previous TRN systems.

In at least some examples, the position calculation unit includes or receives input from a radar altimeter. Measurements from a radar altimeter (radalt) give an indication of height from the ground rather than absolute height. As compared to GPS or other satellite-based navigation systems, radar altimeters are not as easily jammed.

In at least some examples, the position calculation unit is arranged to match radar altimeter measurements of the terrain already traversed with the stored digital terrain map. This allows the position calculation unit to potentially correct for map shift errors and give a more accurate terrain-referenced aircraft position. In at least some examples, in addition or alternatively, the position calculation unit includes an inertial measurement unit and uses inertial measurements to refine the terrain-referenced aircraft position. This is another way of providing a more accurate terrain-referenced aircraft position. In any of these examples, there may be provided a more accurate terrain-referenced aircraft position to be used as the launch point by the fall line calculation unit.

In at least some examples, in addition or alternatively, the position calculation unit may possibly comprise a Global Navigation Satellite System (GNSS) unit, Global Positioning System (GPS) unit, or similar. However, this may make the TRN system more susceptible to jamming or other interceptions. Thus, in at least some examples, the position calculation unit is arranged to calculate aircraft position relative to the digital terrain map without using Global Navigation Satellite System (GNSS), Global Positioning System (GPS) or similar navigation technologies requiring satellite communication.

According to a second aspect, this disclosure further provides a terrain-referenced navigation method comprising: calculating aircraft position relative to a stored digital terrain map to determine a terrain-referenced aircraft position; calculating a fall line for a projectile starting from the terrain-referenced aircraft position as a launch point; and directly comparing the fall line with the digital terrain map, by incrementally comparing a height of the projectile along the fall line with a height of the terrain according to the stored digital terrain map in order to find the expected impact point on the terrain.

The various exemplary features described above in relation to the system apply equally to the disclosed method. The disclosed method may be a computer-implemented method. As is disclosed above, in at least some examples a single processor is arranged to implement all the steps of the disclosed method.

In various examples of the present disclosure, the step of incrementally comparing a height of the projectile along the fall line with a height of the terrain may comprise searching map data in the stored digital terrain map. Taking into account factors such as the available resolution of the map data in the stored digital terrain map and/or processing speed of the impact point calculation unit, the step of searching map data may comprise a single search of the digital terrain map.

In at least some examples, incrementally comparing a height of the projectile along the fall line with a height of the terrain comprises a coarse search of the digital terrain map followed by a fine search of the digital terrain map.

In at least some examples, the method comprises outputting the expected impact point on the terrain, for example on a display.

In at least some examples, the method comprises inputting projectile data, e.g. to assist with calculating a fall line for the projectile.

In at least some examples, calculating aircraft position relative to a stored digital terrain map comprises matching radar altimeter measurements of the terrain already traversed with the stored digital terrain map.

In at least some examples, in addition or alternatively, calculating aircraft position relative to a stored digital terrain map comprises using inertial measurements to refine the terrain-referenced aircraft position.

This disclosure also extends to a computer-readable medium comprising instructions that are executable by a processor to cause a terrain-referenced navigation system to perform any of the above-described methods.

This disclosure also extends to apparatus comprising a processor and a memory, the memory storing instructions that are executable by the processor to cause a terrain-referenced navigation system to perform any of the above-described methods. A single processor may be arranged to perform each of the steps in a given example of the disclosed method.

The methods disclosed herein may be implemented by one or more computer program products or computer readable media provided on one or more devices, or on a single device. The computer program product or computer readable media may include computer code arranged to instruct a computer or a plurality of computers to perform the functions of one or more of the various methods described herein. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD. An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network. In some examples, some of the processes may be performed by software on a user device, while other processes may be performed by software on a server, or a combination thereof. In some other examples, all of the processes may be performed by software on a single user device. The user device may be part of an aircraft control system in a manned or autonomous aircraft.

It will be understood that a projectile as disclosed herein may be any airborne body launched from an aircraft. In various examples of the present disclosure, the projectile is an airborne body having a fall line dictated by the laws of classical mechanics (e.g. taking into account gravity, air resistance, drag, etc.) rather than a guided projectile that is powered in its flight after launch. Thus, in at least some examples, the projectile is an unguided projectile.

BRIEF DESCRIPTION OF DRAWINGS

One or more non-limiting examples will now be described, with reference to the accompanying drawings, in which.

DETAILED DESCRIPTION

Figure 1:
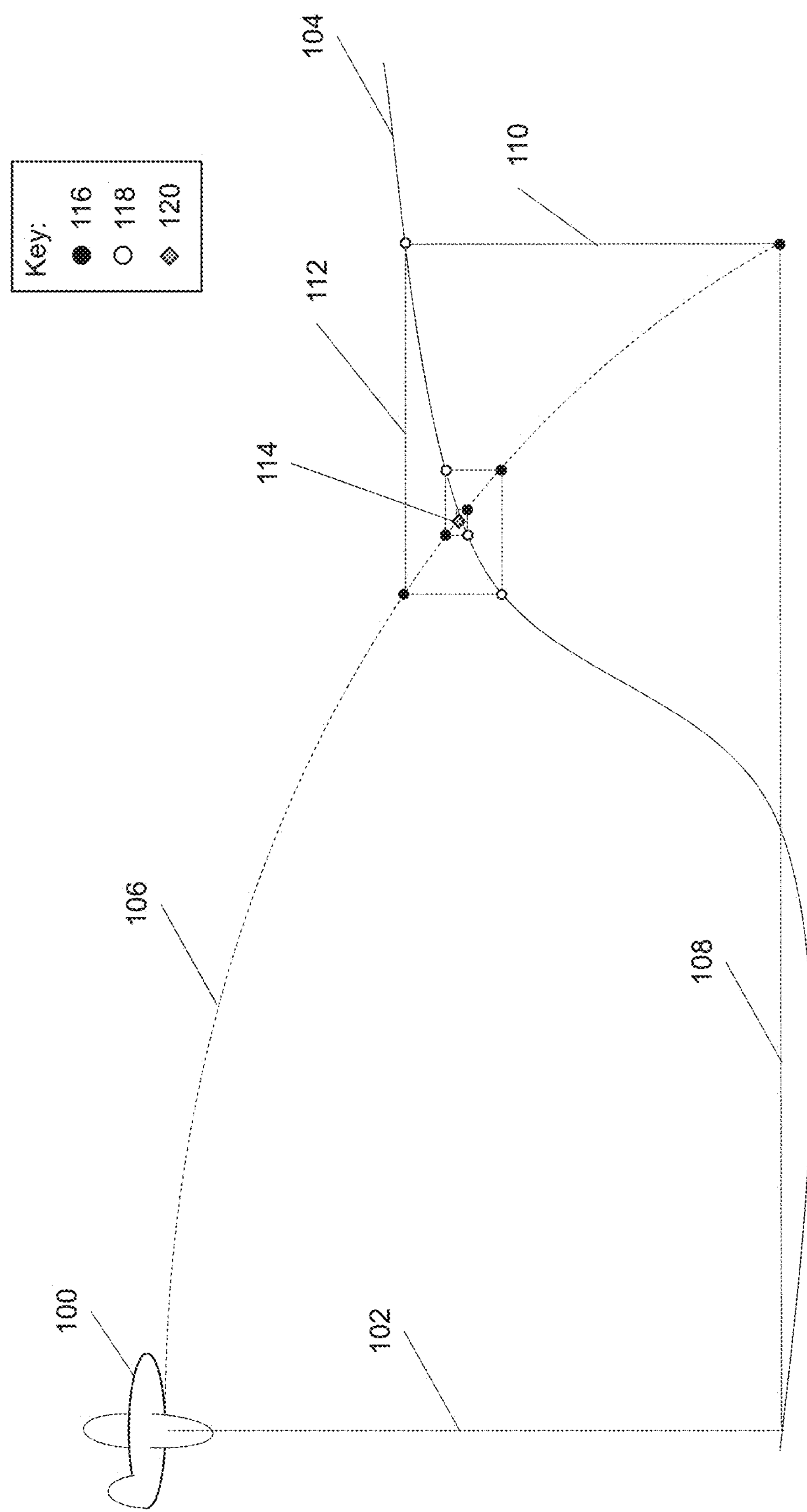
FIG. 1 is a diagram illustrating a prior art iterative process to calculate an estimate of the impact point of a projectile.

FIG. 1 illustrates a prior art iterative process to estimate the impact point of an unguided projectile to be released from an aircraft 100 travelling at an absolute altitude above ground level (AGL) 102, where 104 illustrates a side profile of the terrain being travelled over by the aircraft 100.

The AGL 102 of the aircraft 100 may be measured using a radar altimeter or any other height measuring system (such as sonar, LIDAR, etc.). The position of the aircraft relative to the terrain may be estimated using a Terrain Referenced Navigation (TRN) system by considering the recent AGL measurements of the aircraft and comparing with stored digital terrain map data, containing elevation information about the terrain. Comparing the AGL measurements with the digital terrain map data can allow for a more accurate estimate of the aircraft's position relative to the terrain than through the use of Global Positioning Systems (GPS) or Inertial Navigation Systems (INS) alone, as these position estimation systems can generate errors and drift, which can be observed and corrected for by the TRN system. In addition to this, the stored digital terrain map data itself may contain map shift errors. To estimate the position of the aircraft 100 relative to the terrain any combination of TRN, INS and/or GPS (or similar) may be used. The TRN system may be the TERPROM® (Terrain Profile Matching) digital terrain system available from Atlantic Inertial Systems.

In FIG. 1, 106 illustrates a predicted fall line of a projectile; wherein the term 'fall line' refers to the path that a projectile would follow, once released, if uninhibited by objects or terrain. Conventionally, a ranging system on the aircraft 100 calculates an estimate of the horizontal range 108 for a projectile; wherein the term 'forward throw' refers to the horizontal distance a projectile would travel before falling to a specified altitude, if uninhibited by terrain. In a first iteration, the forward throw of the projectile is calculated using the aircraft's current AGL, giving an initial prediction of the impact point. A marker 116 demonstrates the point in the iteration process where the ranging system has computed a forward throw in this manner. The TRN system then returns terrain elevation data for this point 110. A marker 118 is used wherever the TRN system has returned terrain elevation data in this manner. The ranging system then recalculates the forward throw 112 given this elevation data. These calculations are repeated back and forth in an iterative loop; typically the loop iterates at between 12.5 and 25 Hz. The predicted impact point 114 calculated from this loop, denoted by marker 120, is presented to the pilot in the form of a Constantly Computed Impact Point (CCIP) displayed on the pilot's Heads-Up Display (HUD).

Figure 2:
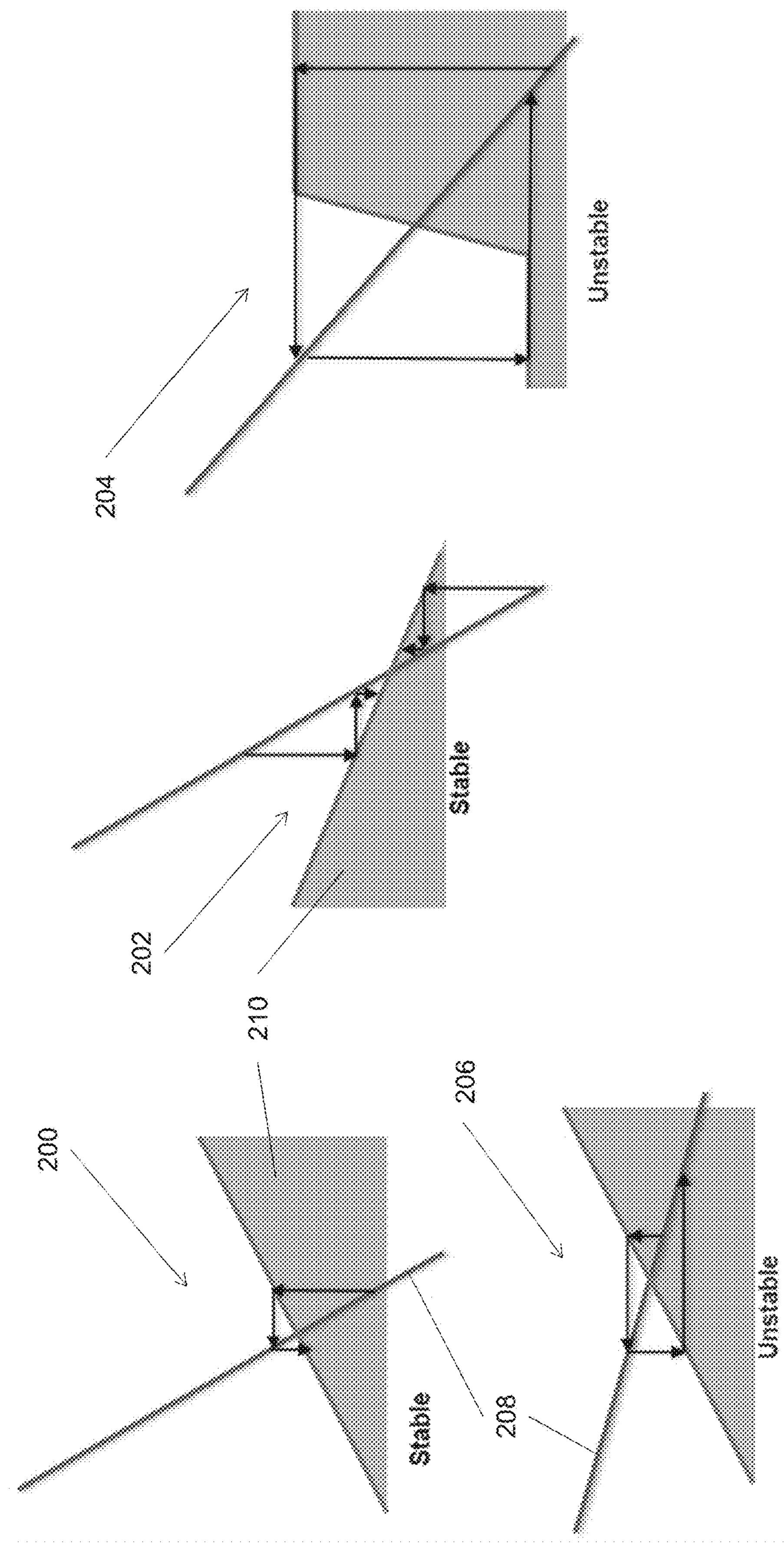
FIG. 2 contains diagrams illustrating examples of stable and unstable prior art iterative loops.

FIG. 2 illustrates one problem with this prior art iterative loop: that the stability of the loop is dependent on the geometry of the fall line 208 and the gradient of the terrain 210 around the impact point. 200 and 202 are examples of stable iterative loops; wherein it is possible to calculate a reasonable estimate of the impact point within a small number of iterations. 204 and 206 are examples of unstable iterative loops; wherein it is not possible to calculate a reasonable estimate of the impact point within a small number of iterations.

Figure 3:
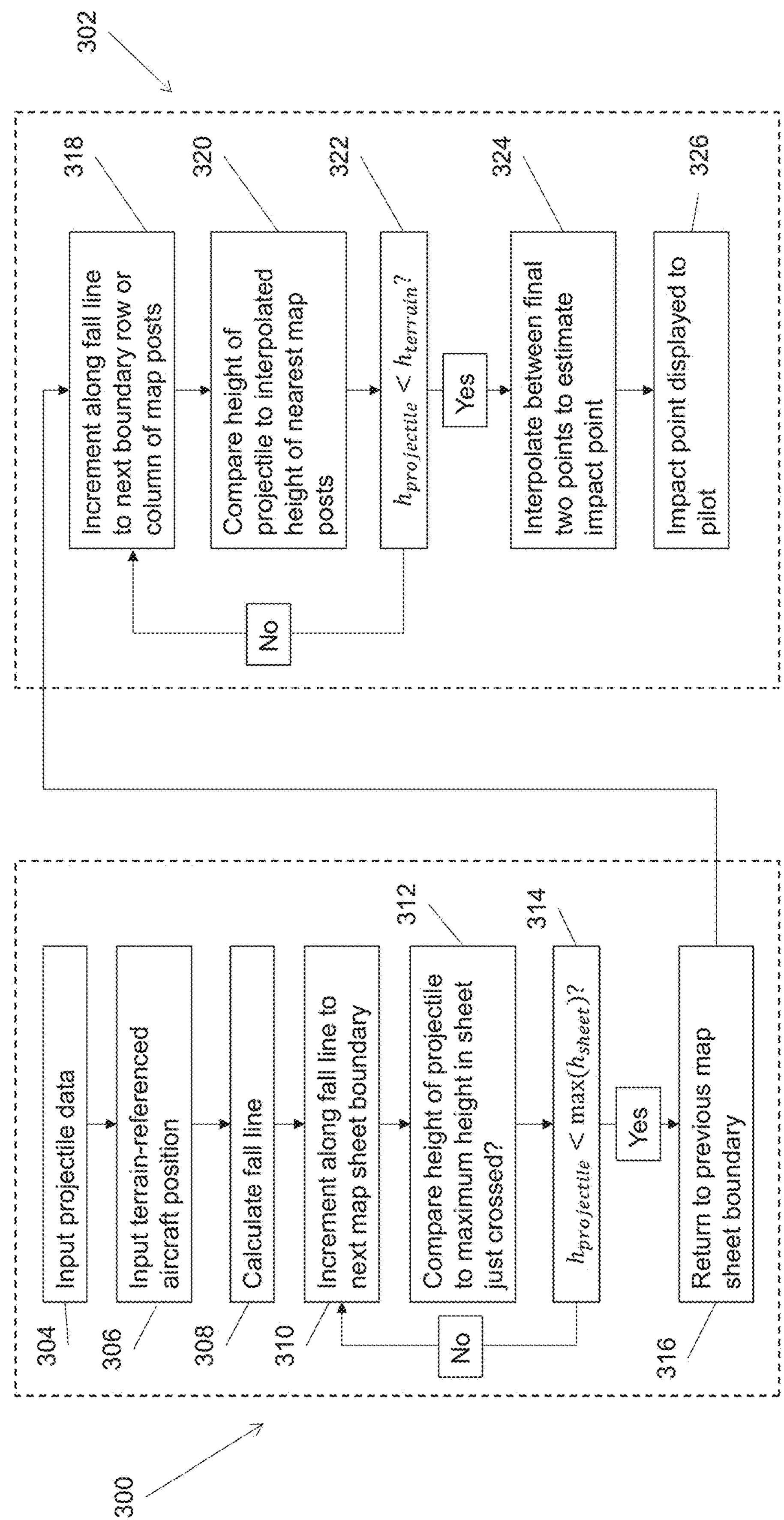
FIG. 3 is a flow chart illustrating an exemplary method, according to the present disclosure, for calculating a predicted impact point of a projectile.

FIG. 3 is a flow chart illustrating an exemplary terrain-referenced navigation method, according to the present disclosure, that is capable of calculating a predicted impact point of a projectile. Such a method may conveniently be implemented within a TRN system rather than requiring a separate ranging system. The method involves calculating the fall line for the projectile and comparing it directly with the terrain map data to find the impact point. Optionally, this may be implemented through a coarse search algorithm 300 followed by a fine search algorithm 302.

At steps 304-316, the method starts by implementing a coarse search algorithm 300. At step 304, projectile data (e.g. mass, cross-sectional area, drag coefficient) is taken as an input in order to allow for more accurate prediction of the impact point of the projectile. At step 306, the terrain-referenced aircraft position, which is being continuously calculated, is then used as the starting position for a fall line calculation at step 308. At step 308, the fall line of the projectile may be calculated using standard techniques. At step 310, the coarse search algorithm 300 then increments along the fall line to the next map sheet boundary in a stored digital terrain map. The digital terrain map data may be stored locally in a computer readable storage medium, e.g. Hard Disk Drive (HDD), or stored remotely e.g. in the cloud.

In at least some examples, the digital terrain map may consist of rows and columns (map posts) of elevation data, where a specific number of these map posts comprises a subset of map data referred to as a "map sheet". This is visualised in FIG. 4*a*, which schematically illustrates a plan view of a digital terrain map 400 interacting with the coarse search algorithm. An edge of a map sheet 402 is denoted by a solid line 408, and an edge of a map post is denoted by a dashed line 410. The boundaries of both map sheets and map posts may be a row or a column of the digital terrain map 400.

At step 312, the coarse search algorithm 300 calculates the height of the projectile at the map sheet boundary 408, and compares it to the maximum height contained within the map sheet 402 just crossed by the predicted fall line 406 of the projectile. At step 314, the coarse search algorithm 300 determines whether the height of the projectile at the boundary 408 is greater than the maximum height in the map sheet 402. If so, the coarse search reiterates and the coarse search algorithm 300 increments along the fall line 406 to the next map sheet boundary. If the height of the projectile at the boundary 408 is smaller than the maximum height in the map sheet 402, the coarse search algorithm 300 proceeds to return to the previous map sheet boundary at step 316, as it is now known that the fall line 406 of the projectile is likely to intersect with the terrain within the area of this map sheet 402.

Figures 4A, 4B:
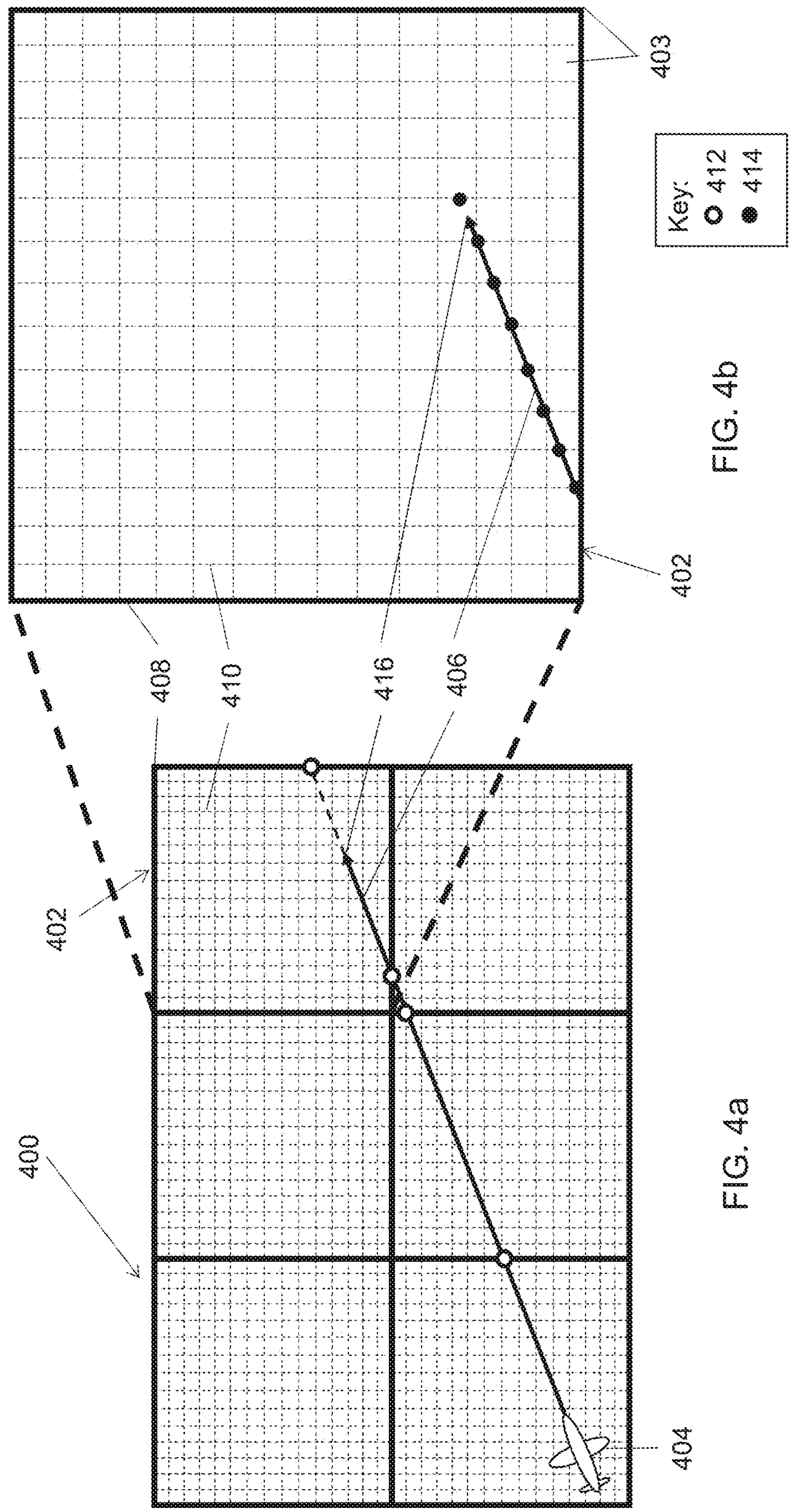
FIG. 4*a* schematically illustrates a plan view of a digital terrain map interacting with a coarse search algorithm, and FIG. 4*b* schematically illustrates a plan view of a digital terrain map sheet interacting with a fine search algorithm, according to such an exemplary method.

At steps 318-326, the method then proceeds to implement a fine search algorithm 302. FIG. 4*b* schematically illustrates a plan view of a digital terrain map sheet 402 interacting with the fine search algorithm. At step 318, the fine search algorithm 302 increments along the fall line 406 to the next boundary row or column 410 of the individual map posts. At step 320, the height of the projectile at the boundary 410 is then compared to the terrain height as interpolated from the nearest map posts. According to step 322, if the calculated height of the projectile is greater than height of the terrain as interpolated from the nearest map posts, the fine search algorithm 302 reiterates and increments along the fall line 406 to the next map post boundary. If the height of the projectile at the boundary is smaller than the interpolated terrain height, the fine search algorithm 302 proceeds at step 324 to interpolate between the final two points on the fall line 406 in order to estimate the impact point 416 of the projectile. Optionally, the impact point 416 is then presented to the pilot at step 326 e.g. in the form of a CCIP on a display.

As described above, FIG. 4*a* schematically illustrates a plan view of a digital terrain map 400 interacting with the coarse search algorithm, and a map sheet 402 within the digital terrain map 400 interacting with the fine search algorithm, wherein the map sheet 402 comprises a number of map posts 403. In this example, the map sheet 402 covers an area of 3 km by 3 km, and each map post 403 covers an area of 1 m by 1 m. It can be seen in FIG. 4*a* how the fall line 406 of a projectile to be released from an aircraft 404 intersects with map sheet boundaries 408 at points denoted by markers 412 as calculated by the coarse search algorithm. Then, the fine search algorithm calculates how the fall line 406 intersects with the map post boundaries 410 within a map sheet 402 at points denoted by markers 414 in FIG. 4*b*. Finally, the predicted impact point 416 of the projectile is calculated by interpolating between the final two markers 414 determined by the fine algorithm.

Figure 5:
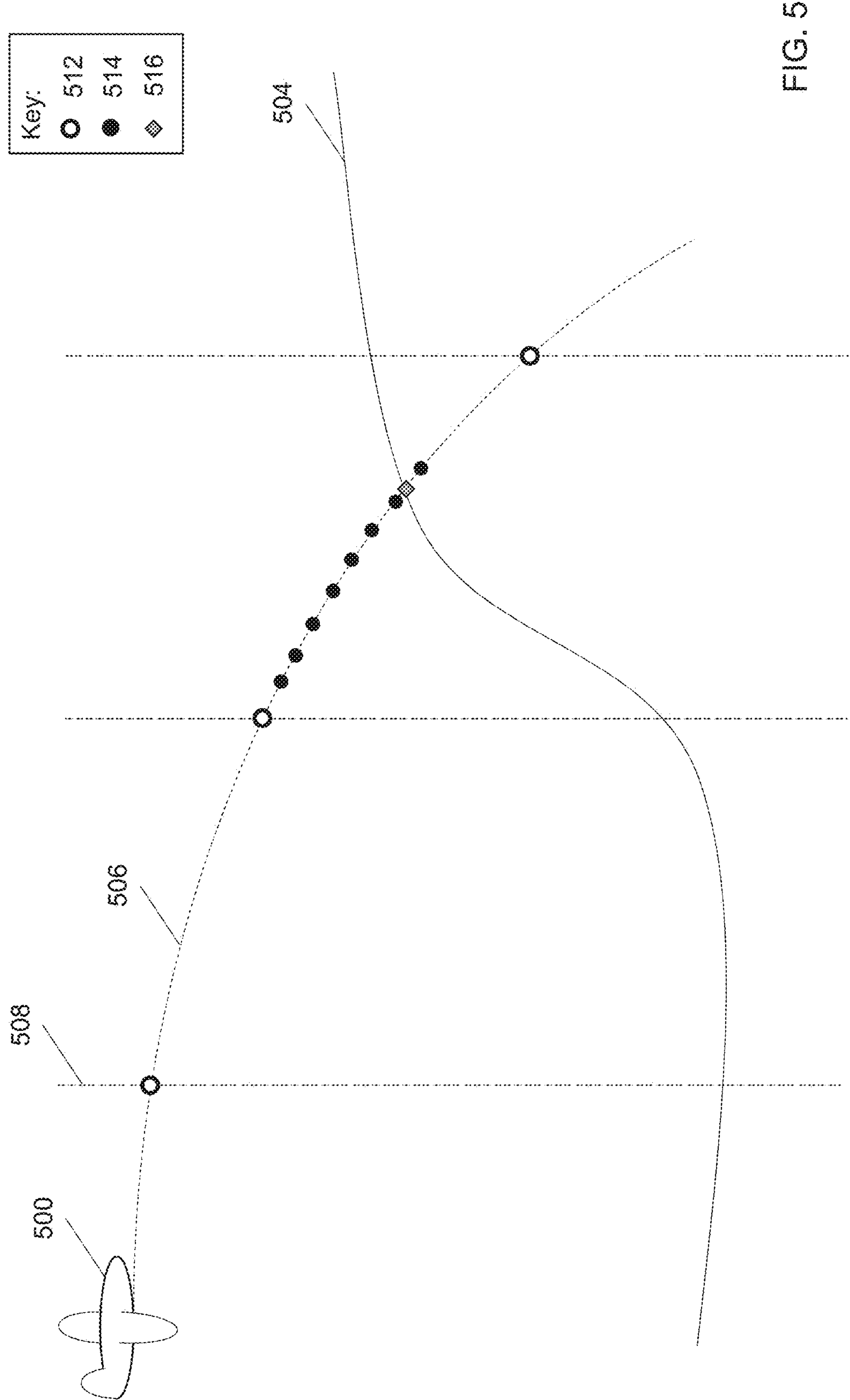
FIG. 5 schematically illustrates a side view of the fall line of a projectile relative to a side profile of the terrain with an impact point being determined according to such an exemplary method.

FIG. 5 illustrates a side view of the fall line 506 of a projectile to be released from an aircraft 500 relative to a side profile 504 of the terrain. As described above, the coarse search algorithm determines how the fall line 506 of a projectile to be released from the aircraft 500 intersects with vertical projections of map sheet boundaries 508 at points denoted by marker 512. Then, as described above, the fine search algorithm determines how the fall line 506 intersects with vertical projections of the map post boundaries at points denoted by marker 514. The final predicted impact point of the projectile with the terrain side profile 504 is denoted by marker 516.

Figure 6:
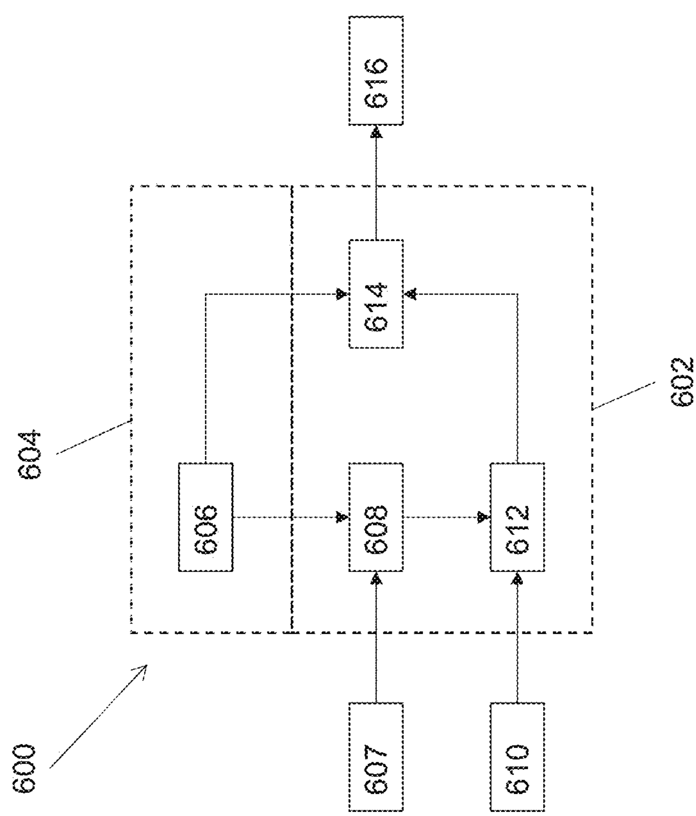
FIG. 6 is a schematic block diagram representing an exemplary terrain-referenced navigation system according to the present disclosure.

There is seen in FIG. 6 a block diagram of a terrain-based navigation system 600. The system 600 comprises a processor 602 coupled to a memory 604. As used herein, the term processor refers to one or more devices, circuits, and/or processing cores configured to process data, such as computer programming instructions; and the term memory refers to any computer storage media including but not limited to volatile and/or non-volatile memory such as read only memory (ROM), and random access memory (RAM). Stored within the memory 604 is a digital terrain map 606. The processor 602 comprises a position calculation unit 608, a fall line calculation unit 612 and an impact point calculation unit 614. In this example, the position calculation unit 608, fall line calculation unit 612 and impact point calculation unit 614 are arranged in a single processor 602.

During use of the terrain-based navigation system 600, the position calculation unit 608, coupled to the stored digital terrain map 606, calculates an estimate of the terrain referenced aircraft position as described previously using recent altitude measurements, in this example input from a radar altimeter (radalt) unit 607. The position calculation unit 608 is also coupled to the fall line calculation unit 612, wherein the fall line calculation unit 612 uses the terrain-referenced aircraft position as provided by the position calculation unit 608 as the start point for the fall line calculation. The fall line calculation unit 612 is optionally coupled to an input unit 610 which is arranged to provide projectile data in order for a more accurate calculation of the fall line of a projectile. The fall line calculation unit 612 is also coupled to the impact point calculation unit 614, which is arranged to iterate along the fall line as provided by the fall line calculation unit 612 and compare with the stored digital terrain map 606, as described previously. The impact point calculation unit 614 is optionally coupled to an output unit 616 which is arranged to present the predicted impact point to the pilot. For example, the predicted impact point may be presented to the pilot by the output unit 616 in the form of a CCIP on a display such as the pilot's HUD, as described previously.

It will be appreciated by those skilled in the art that the present disclosure has been illustrated by describing one or more specific examples thereof, but is not limited to these aspects; many variations and modifications are possible, within the scope of the accompanying claims.

The invention claimed is:

1. A terrain-referenced navigation system for an aircraft, the system comprising:

a memory containing a stored digital terrain map comprising a plurality of map posts of terrain elevation;

a position calculation processing unit that:

receives input from a radar altimeter; and matches radar altimeter measurements of terrain already traversed with the stored digital terrain map in order to calculate aircraft position relative to the stored digital terrain map to determine a terrain-referenced aircraft position;

a fall line calculation processing unit that:

receives the terrain-referenced aircraft position; and calculates a fall line for a projectile starting from the terrain-referenced aircraft position as a launch point;

an impact point calculation processing unit that directly compares the fall line with the digital terrain map, by incrementally comparing a height of the projectile along the fall line with a height of the terrain by searching map data in the stored digital terrain map according to a coarse search of the digital terrain map and then according to a fine search of the digital terrain map in order to find an expected impact point on the terrain; and an output processing unit comprising an aircraft display that displays, to a pilot, the expected impact point on the terrain;

wherein, during the coarse search of the digital terrain map, the impact calculation unit:

increments along the fall line to a boundary of a map sheet, the map sheet comprising a subset of the map posts in the stored digital terrain map, the subset comprising a plurality of map posts;

calculates a maximum height of terrain in the map sheet; and compares a height of the projectile at the map sheet boundary to the maximum height of terrain in the map sheet.

2. The system of claim 1, further comprising:

a local memory;

wherein the stored digital terrain map comprises a plurality of subsets of map data cached in the local memory.

3. The system of claim 2, further comprising:

a processor arranged to calculate a maximum terrain height within each subset of map data while caching the plurality of subsets of map data.

4. The system of claim 1, wherein the position calculation processing unit, fall line calculation processing unit and impact point calculation processing unit are arranged in a single processor.

5. The system of claim 1, further comprising:

an input unit for projectile data.

6. A terrain-referenced navigation method comprising:

receiving input from a radar altimeter;

matching radar altimeter measurements of terrain already traversed with the stored digital terrain map in order to calculate aircraft position relative to the stored digital terrain map to determine a terrain-referenced aircraft position, the digital terrain map comprising a plurality of map posts of terrain elevation data;

calculating a fall line for a projectile starting from the terrain-referenced aircraft position as a launch point;

directly comparing the fall line with the digital terrain map, by incrementally comparing a height of the projectile along the fall line with a height of the terrain by searching map data in the stored digital terrain map according to a coarse search of the digital terrain map and then according to a fine search of the digital terrain map in order to find an expected impact point on the terrain; and displaying, to a pilot, the expected impact point on the terrain on an aircraft display;

wherein the coarse search of the digital terrain map comprises:

incrementing along the fall line to a boundary of a map sheet, the map sheet comprising a subset of the map posts in the stored digital terrain map, the subset comprising a plurality of map posts;

calculating a maximum height of terrain in the map sheet; and comparing the height of the projectile at the map sheet boundary to the maximum height of terrain in the map sheet.

7. The method of claim 6, further comprising:

inputting projectile data.

8. A non-transitory computer-readable medium or computer program product comprising:

instructions that are executable by a processor to cause a terrain-referenced navigation system to:

receive input from a radar altimeter;

match radar altimeter measurements of terrain already traversed with the stored digital terrain map in order to calculate aircraft position relative to the stored digital terrain map to determine a terrain-referenced aircraft position, the stored digital terrain map comprising a plurality of map posts of terrain elevation data;

calculate a fall line for a projectile starting from the terrain-referenced aircraft position as a launch point;

directly compare the fall line with the digital terrain map, by incrementally comparing a height of the projectile along the fall line with a height of the terrain according to the stored digital terrain map according to a coarse search of the digital terrain map and then according to a fine search of the digital terrain map in order to find an expected impact point on the terrain; and display, to a pilot, the expected impact point on the terrain on an aircraft display;

wherein, during the coarse search of the digital terrain map, the instructions cause the terrain-referenced navigation system to:

increment along the fall line to a boundary of a map sheet, the map sheet comprising a subset of the map posts in the stored digital terrain map, the subset comprising a plurality of map posts;

calculate a maximum height of terrain in the map sheet; and compare the height of the projectile at the map sheet boundary to the maximum height of terrain in the map sheet.

9. The system of claim 1, wherein, during the coarse search of the digital terrain map:

when the height of the projectile at the map sheet boundary is determined to be greater than the maximum height of terrain in the map sheet, the impact calculation unit increments along the fall line to the next map sheet boundary; and when the height of the projectile at the map sheet boundary is determined to be smaller than the maximum height of terrain in the map sheet, the impact calculation unit returns along the fall line to the previous map sheet boundary and begins the fine search of the digital terrain map.

10. The system of claim 1, wherein, during the fine search of the digital terrain map, the impact calculation unit:

increments along the fall line to a boundary of a map post in the stored digital terrain map;

interpolates a height of terrain at the map post boundary from the map posts nearest to the map post boundary; and compares a height of the projectile at the map post boundary to the interpolated height of terrain at the map post boundary.

11. The system of claim 10, wherein, during the fine search of the digital terrain map:

when the height of the projectile at the map post boundary is determined to be greater than the interpolated height of terrain at the map post boundary, the impact calculation unit increments along the fall line to the next map post boundary; and when the height of the projectile at the map post boundary is determined to be smaller than the interpolated height of terrain at the map post boundary, the impact calculation unit interpolates along the fall line between the map post boundary and the previous map post boundary in order to estimate the expected impact point on the terrain.

12. The method of claim 6, wherein the coarse search of the digital terrain map comprises:

when the height of the projectile at the map sheet boundary is determined to be greater than the maximum height of terrain in the map sheet, incrementing along the fall line to the next map sheet boundary; and when the height of the projectile at the boundary of the map sheet is determined to be smaller than the maximum height of terrain in the map sheet, returning along the fall line to the previous map sheet boundary and beginning the fine search of the digital terrain map.

13. The method of claim 6, wherein the fine search of the digital terrain map comprises:

incrementing along the fall line to a boundary of a map post in the stored digital terrain map;

interpolating a height of terrain at the map post boundary from the map posts nearest to the map post boundary; and comparing a height of the projectile at the map post boundary to the interpolated height of terrain at the boundary.

14. The method of claim 13, wherein the fine search of the digital terrain map comprises:

when the height of the projectile at the map post boundary is determined to be greater than the interpolated height of terrain at the map post boundary, incrementing along the fall line to the next map post boundary; and when the height of the projectile at the map post boundary is determined to be smaller than the interpolated height of terrain at the map post boundary, interpolating along the fall line between the map post boundary and the previous map post boundary in order to estimate the expected impact point of the projectile.

* * * * *